United States Patent
Fell, Jr. et al.

(10) Patent No.: US 8,326,999 B2
(45) Date of Patent: Dec. 4, 2012

(54) CREATING CONTEXT-SENSITIVE WEBPAGE TIME-OUT INTERVALS

(75) Inventors: Channing W. Fell, Jr., Round Rock, TX (US); Itzhack Goldberg, Hadera (IL); Julianne Frances Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 12/476,631

(22) Filed: Jun. 2, 2009

(65) Prior Publication Data

US 2010/0306392 A1   Dec. 2, 2010

(51) Int. Cl.
  *G06F 15/16* (2006.01)
(52) U.S. Cl. .................... 709/228; 709/219
(58) Field of Classification Search .............. 709/228
  See application file for complete search history.

(56) References Cited

U.S. PATENT DOCUMENTS

| 6,557,038 B1* | 4/2003 | Becker et al. ........... 709/227 |
| 6,687,859 B2 | 2/2004 | Robsman ................. 714/55 |
| 6,944,666 B2* | 9/2005 | Belkin .................. 709/227 |
| 7,676,585 B1* | 3/2010 | Francke et al. ........... 709/229 |
| 2002/0016736 A1* | 2/2002 | Cannon et al. ............ 705/14 |
| 2002/0143958 A1 | 10/2002 | Montero ................. 709/228 |
| 2005/0021731 A1* | 1/2005 | Sehm et al. .............. 709/224 |
| 2005/0060553 A1 | 3/2005 | Allen ................... 713/182 |
| 2005/0071464 A1 | 3/2005 | Kuwata ................. 709/224 |
| 2005/0166138 A1* | 7/2005 | Kundu ................. 715/501.1 |
| 2006/0059556 A1 | 3/2006 | Royer .................. 726/22 |
| 2010/0169343 A1* | 7/2010 | Kenedy et al. ............ 707/758 |
| 2010/0250558 A1* | 9/2010 | Wang ................... 707/749 |
| 2010/0269030 A1* | 10/2010 | Dugonjic et al. .......... 715/207 |
| 2011/0015996 A1* | 1/2011 | Kassoway et al. ........ 705/14.49 |
| 2011/0246406 A1* | 10/2011 | Lahav et al. ............. 706/46 |

FOREIGN PATENT DOCUMENTS

JP   02000222353 A   8/2000

* cited by examiner

*Primary Examiner* — Patrice Winder
*Assistant Examiner* — Tauqir Hussain
(74) *Attorney, Agent, or Firm* — Van Leeuwen & Van Leeuwen; John D. Flynn (57) ABSTRACT

An approach is provided to establish, over a network adapter, network sessions with various client computer systems. Requests for a webpage are received at the network adapter from the client computer systems. The requested webpage is retrieved from a storage area. Multiple timeout intervals are initialized and stored in a memory area, wherein each of the plurality timeout intervals corresponds to one of the client computer systems. The timeout intervals that are initialized are different for at least some of the client computer systems. The requested webpage is returned to the client computer systems. When a timeout interval elapses for any of the client computer systems, the system terminates the session that was established with the client computer system.

17 Claims, 7 Drawing Sheets

CREATING CONTEXT-SENSITIVE WEBPAGE TIME-OUT INTERVALS

TECHNICAL FIELD

The present invention relates to creating context-sensitive time out intervals in data pages, such as webpages. More particularly, the present invention relates to adjusting time out intervals based on user limitations and preferences.

BACKGROUND OF THE INVENTION

It is desirable to have a "timeout" interval associated with any website which grants access to privileged or secure information. At present these "timeout" intervals" are of a fixed form, generally measured in minutes, which may be configurable across the entire website, or which may be fixed by the website designer. This presents a challenge when dealing with certain types of information and webpages. This challenge is further exacerbated by certain user limitations, such as sight impairment, where impaired individuals would like additional time to view a webpage beyond the timeout interval provided by the site designer.

SUMMARY

An approach is provided to establish, over a network adapter, network sessions with various client computer systems. Requests for a webpage are received at the network adapter from the client computer systems. The requested webpage is retrieved from a storage area. Multiple timeout intervals are initialized and stored in a memory area, wherein each of the plurality timeout intervals corresponds to one of the client computer systems. The timeout intervals that are initialized are different for at least some of the client computer systems. The requested webpage is returned to the client computer systems. When a timeout interval elapses for any of the client computer systems, the system terminates the session that was established with the client computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
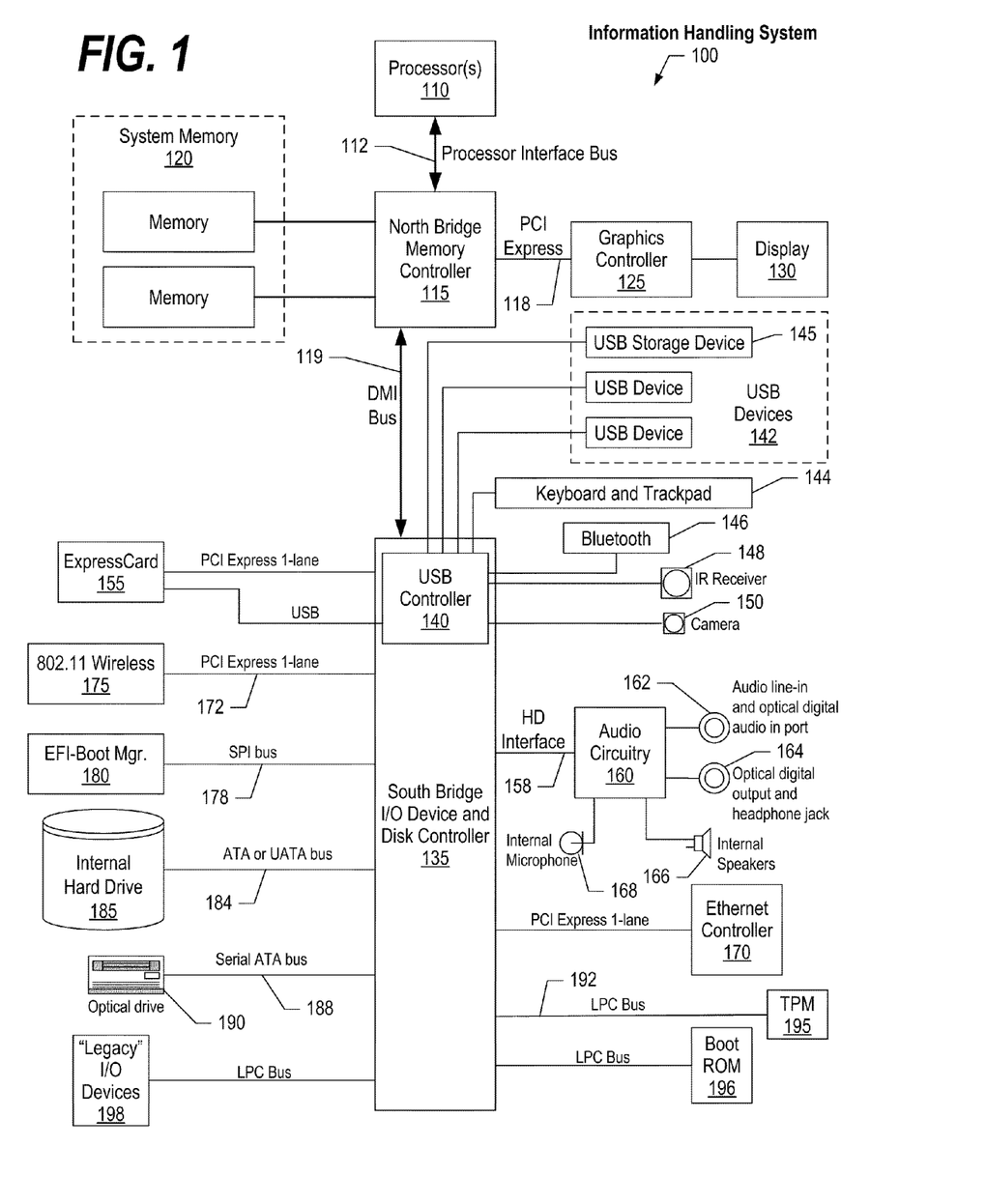
FIG. 1 is a block diagram of a data processing system in which the methods described herein can be implemented.
Figure 2:
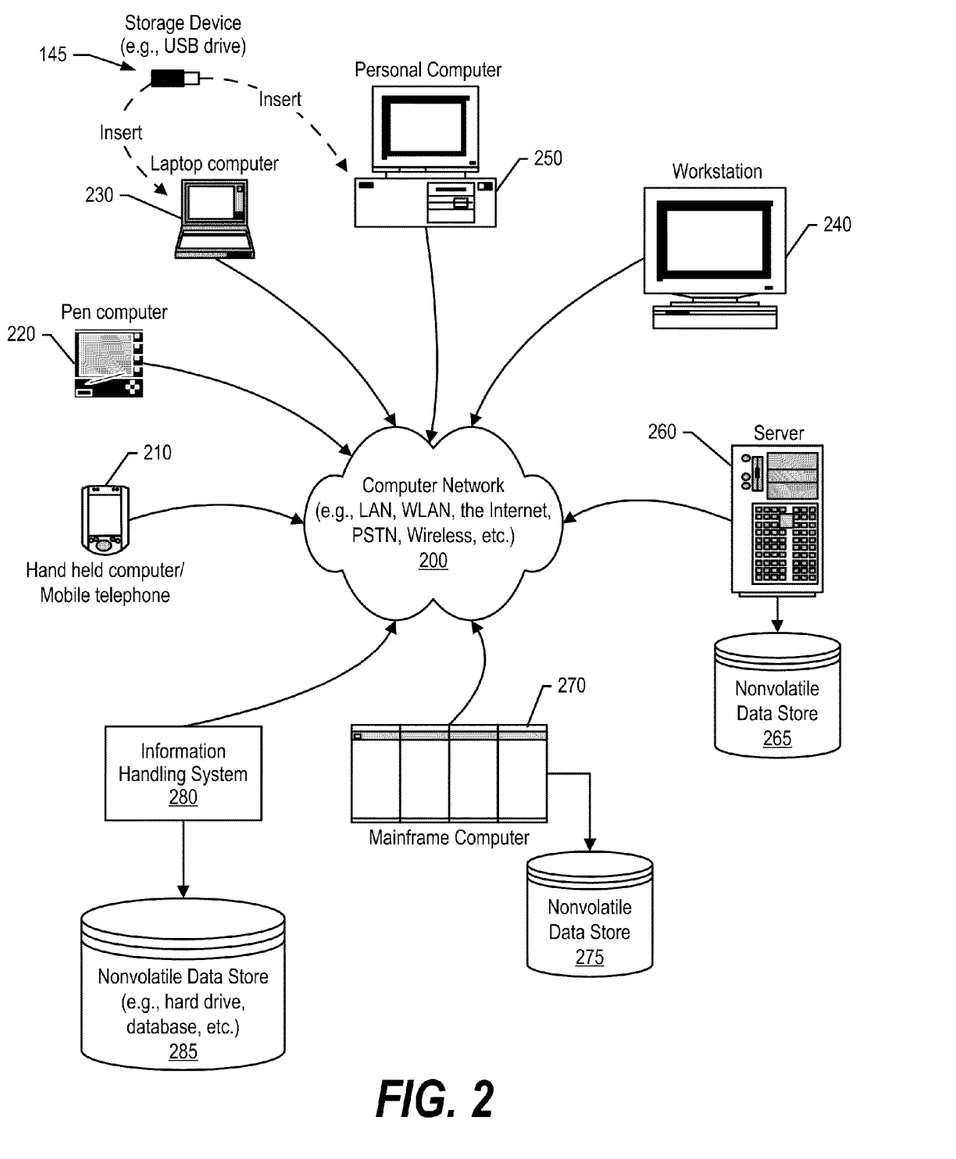
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
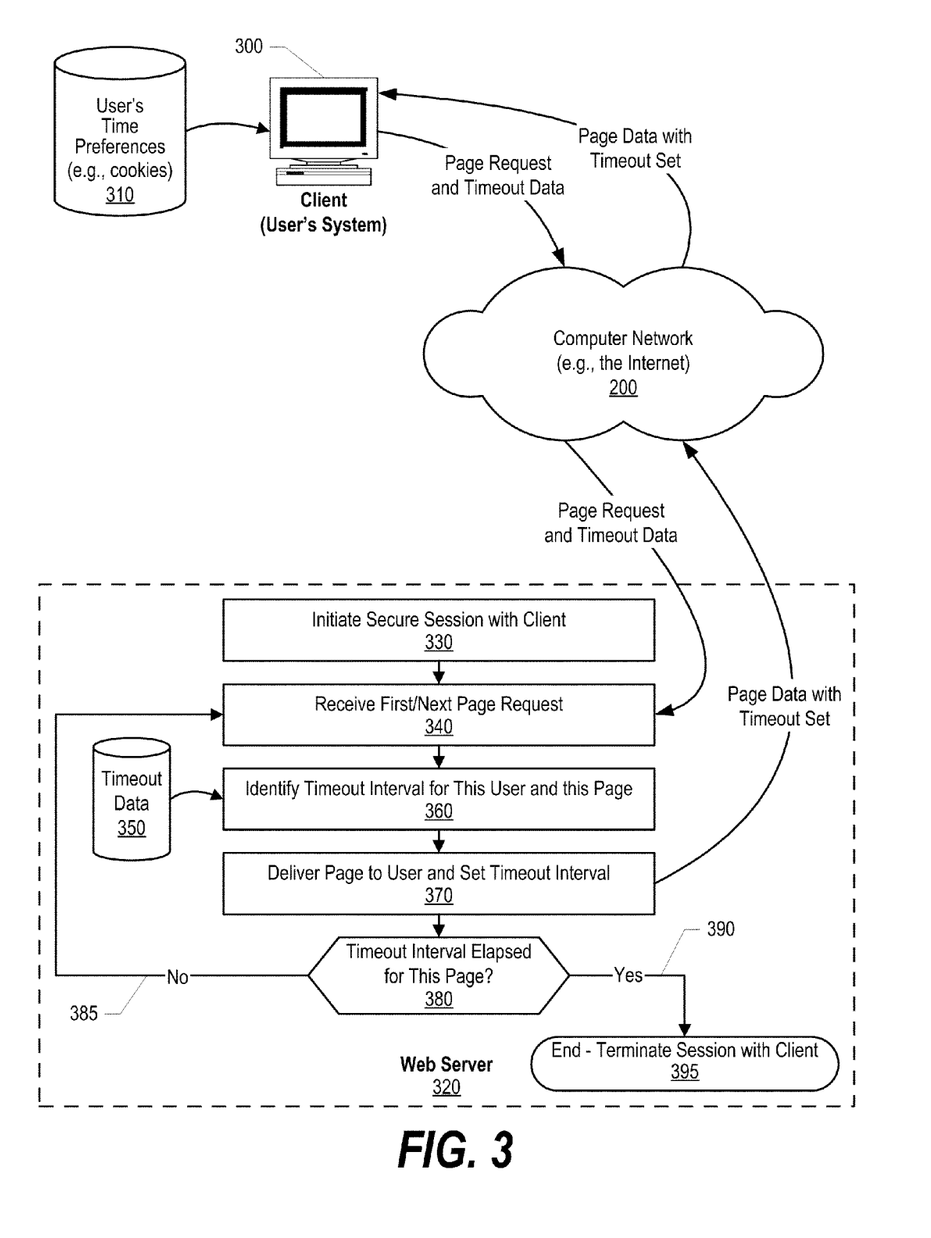
FIG. 3 is a diagram depicting a client system used by a user interacting with a web server to provide context-sensitive time out intervals in pages provided by the web server.

FIG. 3 is a diagram depicting a client system used by a user interacting with a web server to provide context-sensitive time out intervals in pages provided by the web server. Client computer system 300 is used by a user and, as known by those skilled in the art, might include any sort of computer system such as a personal computer (PC), a notebook, or laptop, computer system, a handheld computer system, such as a Personal Digital Assistant (PDA), or a small, mobile pervasive computer system, such as a "smart" mobile telephone. In one embodiment, the user's time preferences are stored in nonvolatile storage area 310, such as a nonvolatile memory or hard disk drive. In a browser-based implementation, the preferences may also be maintained as "cookies" with data that are provided to web servers upon the user's access of the web server from client computer system 300. The user requests a web page from web server 320. The page request includes the page address (e.g., URL) and, if the timeout preference is being provided by the client computer system, the request may also include timeout data, such as a preferred timeout value. The request is sent to web server 320 via computer network 200, such as the Internet.

Web server processing is shown commencing at 330 when the web server initiates a session, usually a secure session, with the client computer system. A secure session can be established using a known protocol, such as using Secure Socket Layers (SSL), that utilizes encryption to secure the session. At step 340, the web server receives a webpage request from client computer system 300. At step 360 the web server identifies a timeout interval to use for this webpage/user. The timeout interval identification can be made using the user's timeout preference data, if provided, as well as timeout data 350 maintained by the web server. Timeout data 350 can include data such as the complexity/attributes of the web page that is being requested as well as historical data that indicates how long users, or this user in particular, have previously taken when using the webpage. At step 370, the requested webpage is delivered to the user and the identified timeout interval is set.

A determination is made as to whether the identified timeout interval has elapsed for this webpage (decision 380). If the timeout interval has not elapsed, then decision 380 branches to "no" branch 385 which loops back to receive the user's next request for a different webpage and identify a corresponding timeout interval as described above. On the other hand, if the timeout interval elapses for the webpage, then decision 380 branches to "yes" branch 390 whereupon the web server terminates the secure session with the client computer system at step 395.

While a single client computer system is shown in FIG. 3, it is evident that, using the technology and steps described herein, multiple users can simultaneously have secure sessions with web server 320 and can each request the same web page. However, because of the identification of timeout intervals described above, different timeout intervals can be established for different users. For example, one user may receive a detailed webpage and have a five minute timeout interval, a second user may receive the same detailed webpage but may have a ten minute timeout interval because of a condition, such as a visual impairment, while a third user may receive the same detailed webpage and receive an even longer timeout interval because the third user is utilizing a PDA with a small display screen to view the detailed webpage.

Figure 4:
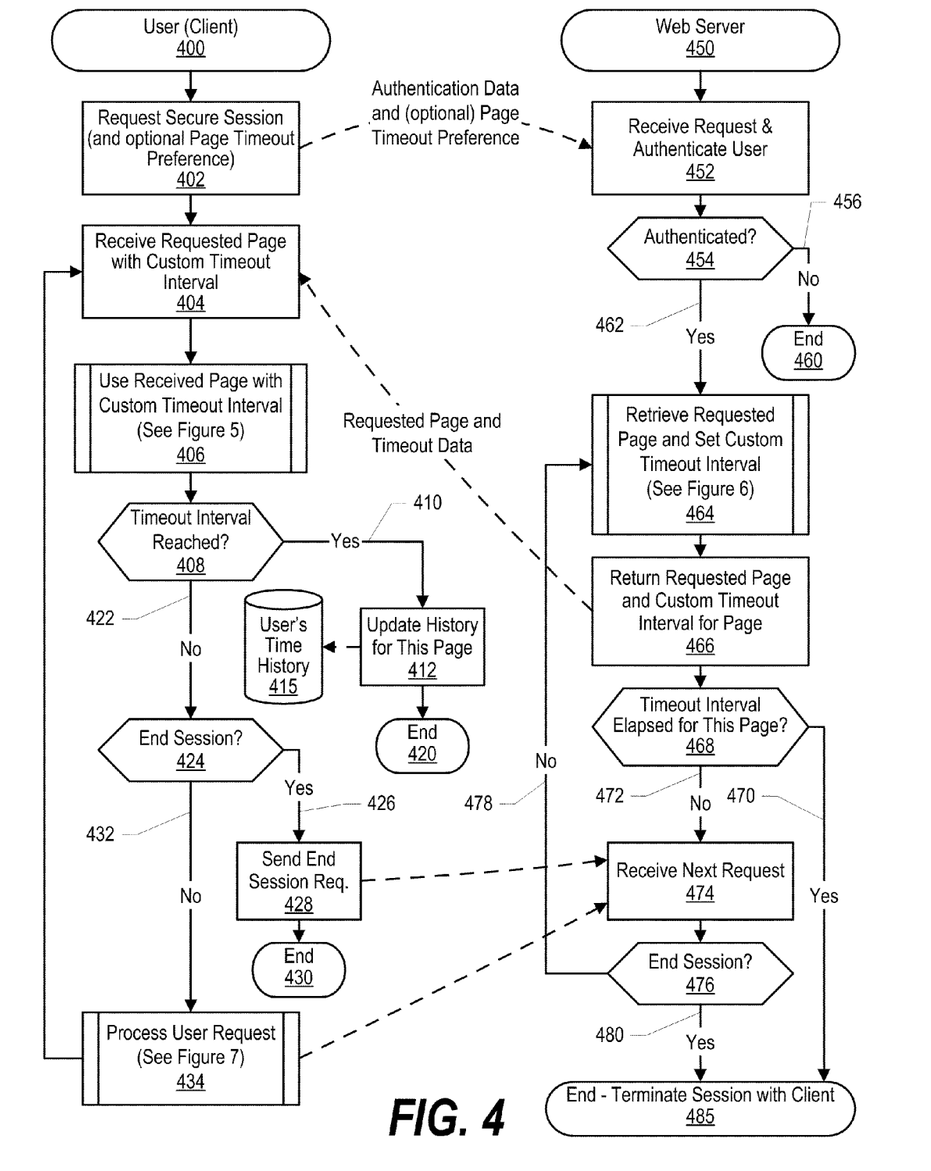
FIG. 4 is a flowchart showing the high level steps performed by the client and server shown in FIG. 3.

FIG. 4 is a flowchart showing the high level steps performed by the client and server shown in FIG. 3. Steps performed at the client computer system are shown commencing at 400 whereupon, at step 402, the client computer system requests a secure session (e.g., utilizing SSL) with the web server. In addition, the client computer system can specify page timeout preference data. For example, if the client computer system is a small, mobile device that requires additional time to navigate the screen, or if the user of the client computer system is visually impaired, page timeout data may be sent to the web server requesting additional time (e.g., fifty percent more time) for all webpages returned by the web server. At step 404, the client computer system receives the first requested page with the timeout interval that was identified and initialized for the webpage and the requesting client computer system. At predefined process 406, the received web page is used with the initialized timeout interval (see FIG. 5 and corresponding text for processing details). A determination is made as to whether the timeout interval has been reached (decision 408). If the timeout interval has been reached, then decision 408 branches to "yes" branch 410 whereupon, at step 412, the user's history of using this page is updated and stored in user's time history data store 415, such as in a nonvolatile memory or hard disk drive. Client computer system processing thereafter ends at 420.

Returning to decision 408, if the timeout interval has not been reached, then decision 408 branches to "no" branch 422 whereupon a determination is made as to whether the user has requested to end the secure session with the web server (decision 424). If the user has requested to end the secure session with the web server (e.g., by clicking on an "end session" link, etc.), then decision 424 branches to "yes" branch 426 whereupon, at step 428, a message is sent to the web server requesting that the secure session be terminated. Client computer system processing thereafter ends at 430.

Figure 7:
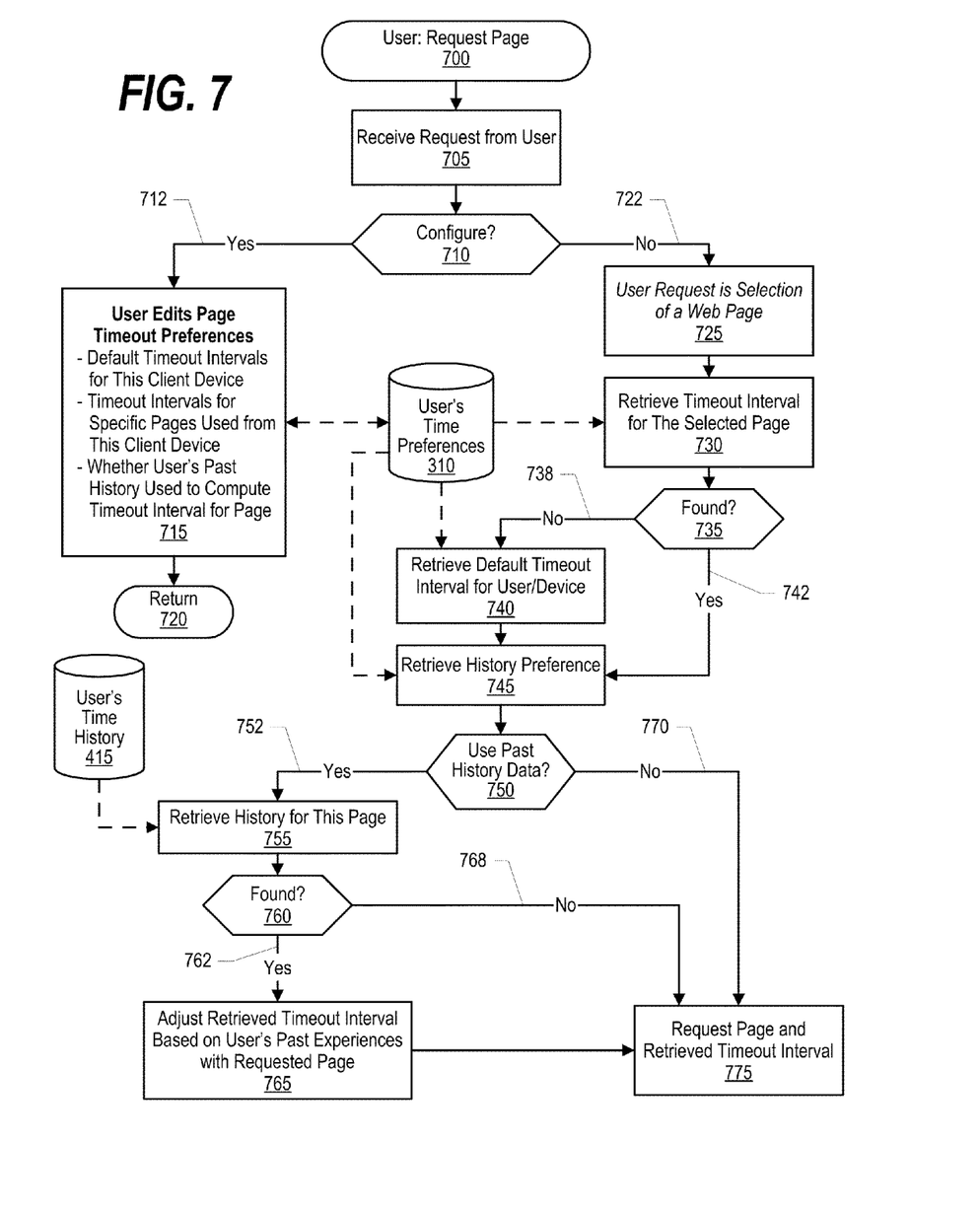
FIG. 7 is a flowchart showing steps taken by client computer system to request a page from the web server along with a preferred timeout interval for the page that is being requested.

Returning to decision 424, if the user is not requesting to end the secure session with the web server, then decision 424 branches to "no" branch 432 whereupon, at predefined process 434, the user requests another webpage from the web server (see FIG. 7 and corresponding text for processing details). Processing then loops back to receive the newly requested web page and the timeout interval that was identified and initialized for the newly requested web page. Client (user) processing continues until the session is terminated either by the web server (e.g., a timeout interval was reached for one of the requested web pages), or by the client computer system (e.g., the user of the client computer system requests to end the secure session with the web server, closes the browser or network session, turns off the client computer system, etc.).

Processing performed by the web server is shown commencing at 450. At step 452, the web server receives a request from a user and authenticates the user as needed (e.g., a userid/password, digital certificate, etc.). A determination is made as to whether the user is authenticated (decision 454). If the user is not successfully authenticated, decision 454 branches to "no" branch 456 whereupon web server processing ends at 460 without establishing a secure session with the user. On the other hand, if the user is successfully authenticated, a secure session is established with the client computer system and decision 454 branches to "yes" branch 462 to provide webpages to the client computer system. At predefined process 464, the web server retrieves a requested webpage and initializes a timeout value for the user (see FIG. 6 and corresponding text for processing details). As the web server is processing requests for multiple users, at predefined process 464 the web server initializes different non-equal timeout intervals with each of the timeout intervals corresponding to a different client computer system. While multiple client computer systems may have the same timeout interval for a given webpage (e.g., a default timeout interval), other client computer systems may have different timeout intervals. These different timeout intervals may be based on user characteristics, such as impairments or other disabilities, user preferences, as well as the device characteristics of the client computing device (e.g., a mobile device with a small display that is more difficult to navigate and view than a larger display attached to a standard desktop computer system). After the requested webpage has been retrieved and a timeout interval has been initialized for the webpage, at step 466 the requested webpage is returned to the client computer system along with the value of the initialized timeout interval.

A determination is made as to whether the timeout interval that was initialized for this webpage has elapsed (decision 468). If the timeout interval has elapsed, then decision 468 branches to "yes" branch 470 whereupon the secure session that was established with the client computer system is terminated at 485. On the other hand, if the timeout interval has not elapsed for this webpage, then decision 468 branches to "no" branch 472 whereupon, at step 474, the next request is received from the client computer system. A determination is made as to whether the client computer system has requested to end the secure session (decision 476). If the request is to end the session, then decision 476 branches to "yes" branch 480 whereupon the secure session that was established with the client computer system is terminated at 485. On the other hand, if the request is not to end the session, then decision 476 branches to "no" branch 478 which loops back to retrieve the next webpage requested by the client computer system and initialize a timeout interval for the newly retrieved webpage. This looping continues until the session is terminated, either by the web server if the initialized timeout interval elapses for any given webpage, or by the client computer system (e.g., requesting to end the session).

The client processing shown commencing at 400 can be performed by multiple client computer systems simultaneously. In this manner, each of the client computer systems can request the same webpage but different timeout intervals can be initialized for the various clients (users).

Figure 5:
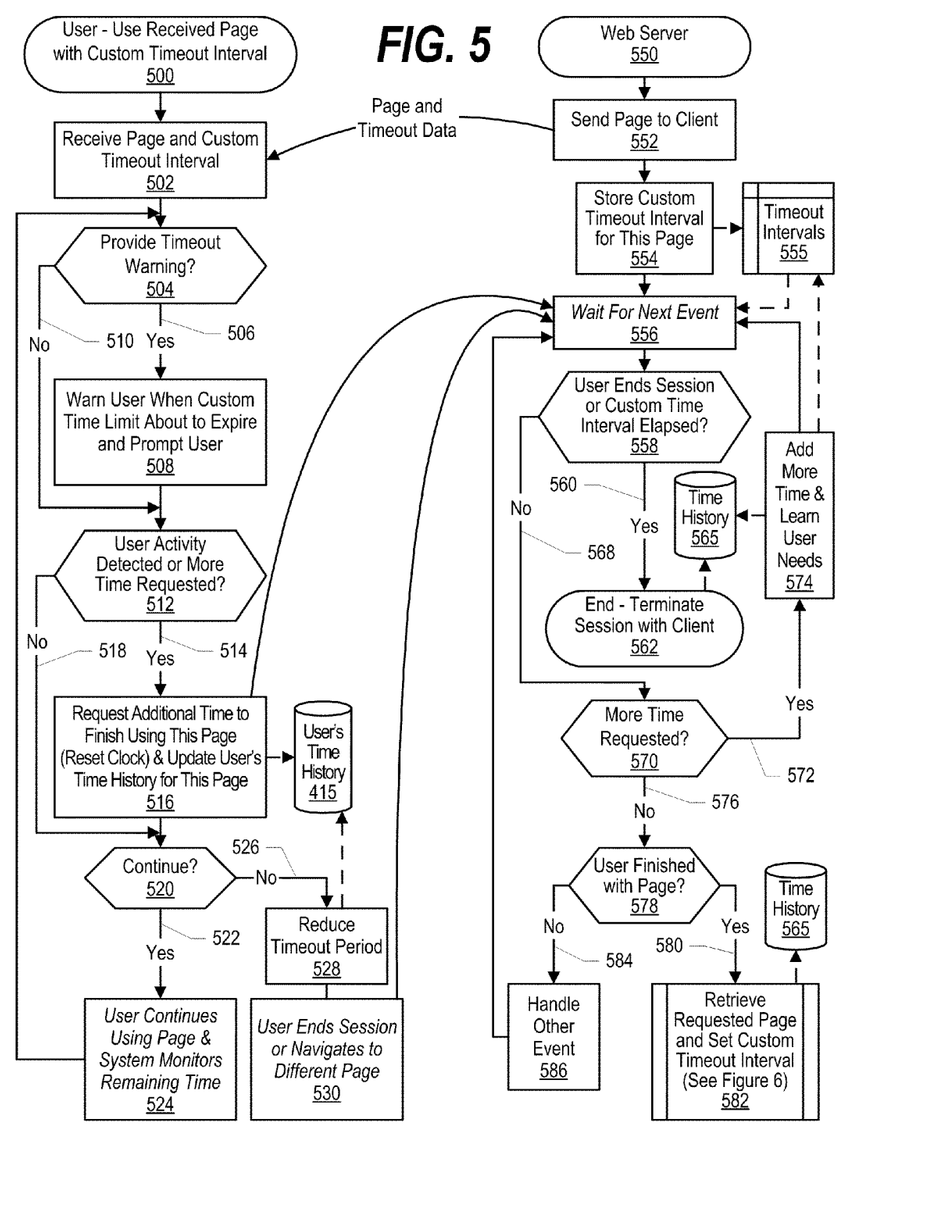
FIG. 5 is a flowchart showing interaction between the client an server systems with the client system using a page received from the server with a custom timeout interval.

FIG. 5 is a flowchart showing interaction between the client an server systems with the client system using a page received from the server with a custom timeout interval. Processing performed at the client computer system is shown commencing at 500 whereupon, at step 502, the client computer system receives a webpage from the web server along with the timeout interval that has been initialized for the webpage. A determination is made (e.g., based on user preferences, etc.) as to whether a timeout "warning" (e.g., visual or auditory signal to the user of the client computer system) should be provided when the timeout interval is about to expire (decision 504). If a timeout warning is to be provided, then decision 504 branches to "yes" branch 506 whereupon, at step 508, a visual or auditory warning is provided to the user of the computer system that notifies the user when the timeout interval is about to expire and prompts the user to take action. On the other hand, if a timeout warning is not provided, then decision 504 branches to "no" branch 510 bypassing step 508.

A determination is made as to whether user activity is detected on the webpage or if additional time has been requested by the user to use the webpage (decision 512). If user activity has been detected or if the user has requested additional time to use the webpage, then decision 512 branches to "yes" branch 514 whereupon, at step 516, a request is sent to the web server requesting additional time (e.g., increasing the timeout interval for the webpage). In addition, the user's time history is recorded in user's time history data store 415 noting that the user needed extra time to complete use of the webpage. On the other hand, if user activity was not detected and the user did not request additional time, then decision 512 branches to "no" branch 518 bypassing step 516.

A determination is made as to whether the user wishes to continue using the current webpage (decision 520). If the user is continuing use of the current webpage, then decision 520 branches to "yes" branch 522 whereupon, at step 524, the user continues using the webpage and the system monitors the user's remaining time (e.g., in order to warn the user when the timeout interval is about to expire, etc.). Processing loops back to steps used to provide warnings and monitor the user's activities. On the other hand, if the user does not wish to continue use of the webpage, then decision 520 branches to "no" branch 526 whereupon, at step 528, the user's time history is recorded in data store 415 noting the amount of time the user needed to complete the webpage (if the user is navigating to a different page), and at step 530, the user navigates to a different webpage or ends the secure session with the web server.

Turning now to steps performed by the web server, web server processing is shown commencing at 550 whereupon, at step 552, a webpage that was requested by the client is sent to the client computer system. At step 554, the timeout interval that was initialized for this webpage being used by this particular client is stored in timeout intervals memory area 555. At step 556, the web server waits for an event to occur regarding the client (e.g., request for additional time to use the webpage, request for a different webpage, request to end the secure session, or the elapsing of the timeout interval that was initialized for this client). When an event occurs, a determination is made as to whether the timeout interval that was initialized for this client to use this webpage has expired or if the client has requested to end the secure session with the server (decision 558). If the timeout interval has expired or the client has requested to end the secure session, then decision 558 branches to "yes" branch 560 whereupon the session with the client is terminated at 562. In addition, time history data store 565 is updated in the case that the timeout interval expired in order to record the occurrence for future reference. For example, if the user routinely runs out of time using this webpage, during future sessions, the web server may provide additional time for the user to complete use of the web page. On the other hand, if the user did not request to end the session and the timeout interval that was initialized did not expire, then decision 558 branches to "no" branch 568 in order to handle another event that did occur.

A determination is made as to whether the client computer system requested additional time to finish using the webpage (decision 570). If additional time was requested, then decision 570 branches to "yes" branch 572 whereupon, at step 574, additional time is added to the currently initialized timeout interval stored in memory 555 (to provide the user additional time during this session), and the client's request is recorded in time history data store 565 for future reference (e.g., so that the web server may initialize the timeout interval for a greater amount of time during a subsequent session with this client). Processing loops back to step 556 to wait for the next event to occur.

On the other hand, if the event was not to request more time, then decision 570 branches to "no" branch 576 whereupon a determination is made as to whether the user is finished with the current webpage (decision 578). If the user is finished with the current webpage, then decision 578 branches to "yes" branch 580 whereupon, at predefined process 582, the next webpage that has been requested by the client is retrieved and an appropriate timeout interval is initialized for the next webpage (see FIG. 6 and corresponding text for processing details). In addition, the time needed by the user to complete the webpage is recorded in time history data store 565 so that an appropriate amount of time may be allocated the next time that the webpage is requested by the client. For example, if a default timeout period for a webpage is ten minutes but this client routinely completes use of the webpage in two minutes, the timeout interval that is initialized for the webpage during future sessions may be reduced to an appropriate amount, such as five minutes. After the new webpage has been retrieved and the appropriate timeout interval has been identified, processing loops back to the top (step 552) to send the webpage to the client, initialize the new timeout interval, and monitor the client's usage of the webpage for events as described above. On the other hand, if the user is not finished with the webpage, then decision 578 branches to "no" branch 584 whereupon, at step 586, some other event is handled by the web server and processing loops back to step 556 to continue waiting for the next event to occur.

Figure 6:
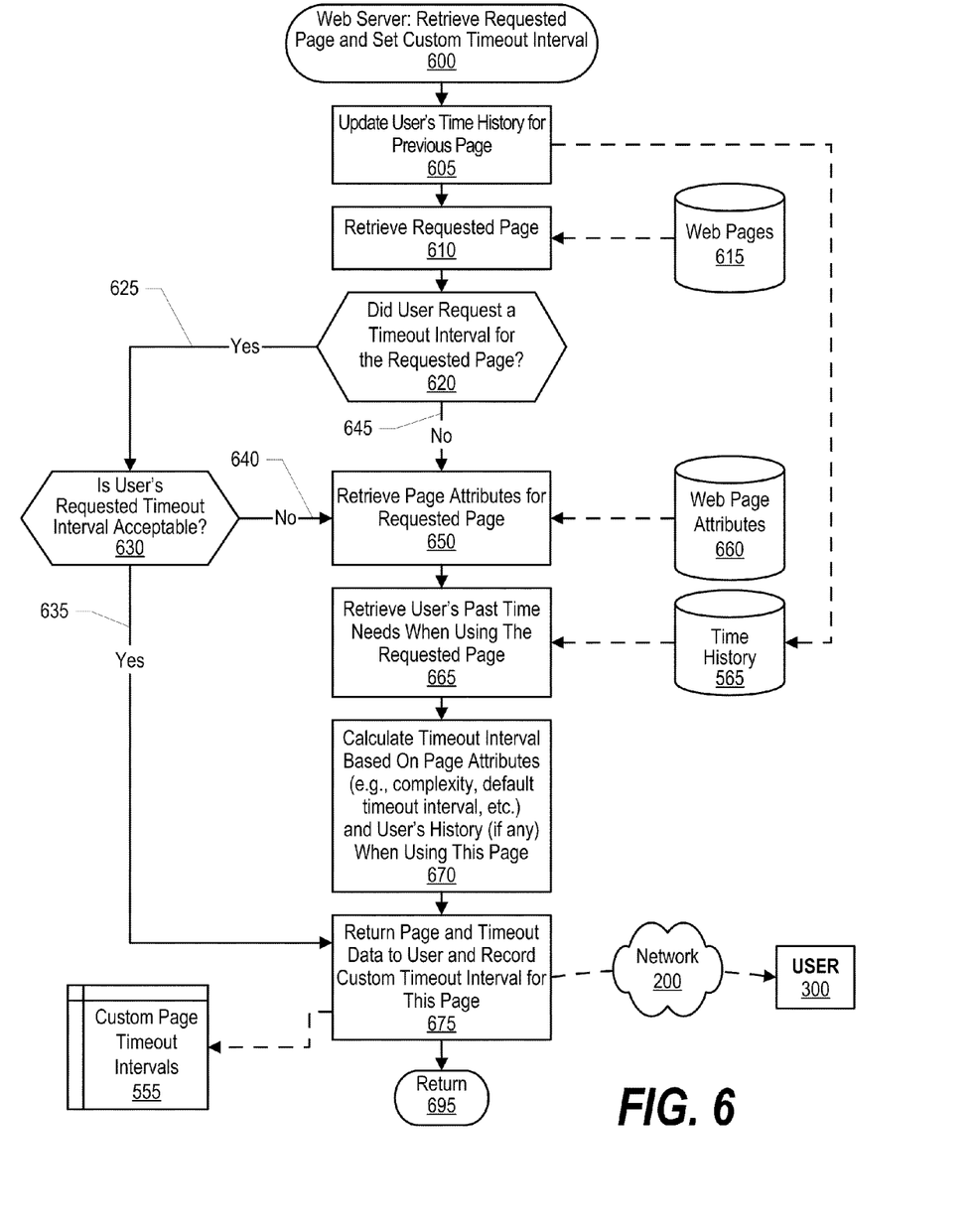
FIG. 6 is a flowchart showing steps taken by the web server to retrieve a page requested by the user and set a custom timeout interval for using the retrieved page.

FIG. 6 is a flowchart showing steps taken by the web server to retrieve a page requested by the user and set a custom timeout interval for using the retrieved page. Processing performed in this routine by the web server commences at 600 whereupon, at step 605, time history data store 565 is updated to reflect the time used by the user of the previous webpage (unless this is the first web page being provided by the server). At step 610, the web page that is being requested by the client computer system is retrieved from web pages data store 615. A determination is made as to whether the user included a timeout interval in the request received from the client computer system for the webpage (decision 620). If the user included a particular timeout interval request, then decision 620 branches to "yes" branch 625 whereupon a determination is made as to whether the timeout interval requested by the client computer system is acceptable (decision 630). For example, if a default timeout interval for a particular webpage is ten minutes and the maximum allowed timeout interval for the page is sixty minutes, then a request for two hours would be rejected. If the requested timeout interval is acceptable, then decision 630 branches to "yes" branch 635 whereupon, at step 675, the timeout interval requested by the client computer system is stored in timeout intervals memory area 555 and the retrieved page is sent to user 300 via computer network 200 along with the timeout interval. Processing then returns to the calling routine (see FIG. 5) at 695.

On the other hand, if either the timeout interval requested by the client is not acceptable (decision 630 branching to "no" branch 640) or a timeout interval was not requested by the client computer system (decision 620 branching to "no" branch 645), then, at step 650, the webpage attributes are retrieved from webpage attributes data store 660. In another embodiment, the web page attributes are identified by analyzing the web page retrieved at step 610. At step 665, past time needs are retrieved from time history data store 565 for this particular client (user) when using the requested webpage. At step 670, the timeout interval that will be used for the retrieved webpage is calculated based on the webpage attributes and/or the user's past history of using the requested webpage. For example, a default timeout interval for a particular page might be ten minutes with the time history for the user indicating that this user needs additional time to use the requested webpage, so the timeout interval may be set at twenty minutes for the user. At step 675, the retrieved webpage is sent to user 300 via network 200 along with the timeout interval. In addition, the timeout interval is initialized and stored in timeout intervals memory area 555. Processing then returns to the calling routine (see FIG. 5) at 695.

FIG. 7 is a flowchart showing steps taken by client computer system to request a page from the web server along with a preferred timeout interval for the page that is being requested. Processing performed at the client computer system is shown commencing at 700 whereupon, at step 705, the system receives a request from the user of the client computer system. A determination is made as to whether the user is requesting to configure the timeout preferences stored at the client computer system (decision 710). If the user is requesting to configure the timeout preferences, then decision 710 branches to "yes" branch 712 whereupon, at step 715, the user edits the timeout preferences. The user's timeout preferences are retrieved from data store 310 and made available for editing. As shown, the timeout preferences include a default timeout interval preference to use when the user is using this particular client computer system. For example, if the user access the web server from a desktop computer system as well as a small, mobile, handheld computing device, the user may wish for additional time when using the handheld device because of the limited display screen size and the extra time needed to navigate through the data displayed on the display screen. In addition, the user can specify timeout intervals for specific pages used from this client computer system. For example, when using an online banking application, most webpages might not present difficulty navigating, however a larger screen showing balances and transactions may require additional time beyond the default time allocated for the banking webpages. Here, the user can specify that additional time (e.g., thirty minute timeout period when using the balances and transactions webpage and twenty minutes when using other banking webpages) be requested when the user requests the particular webpage. In addition, the user can specify whether the system should keep track and use the user's past surfing experiences when computing and requesting timeout intervals. The user's timeout preference selections are stored back to time preferences data store 310 that is stored in a nonvolatile storage area accessible to the client computer system. Processing then returns to the calling routine (see FIG. 4) at 720.

Returning to decision 710, if the user did not request to configure the timeout preferences, then decision 710 branches to "no" branch 722 whereupon, at step 725, the system recognizes that the user request is for a new webpage. At step 730, the system searches time preferences data store 310 for a webpage-specific timeout for the webpage requested by the user. A determination is made as to whether the webpage-specific timeout interval was found (decision 735). If the webpage-specific timeout interval was not found, then decision 735 branches to "no" branch 738 whereupon, at step 740, a default timeout interval is retrieved from time preferences data store 310. Returning to decision 735, if the webpage-specific timeout interval was found, then decision 735 branches to "yes" branch 742 bypassing step 740.

At step 745, the history preference is retrieved from time preferences data store 310, the history preference indicating whether the user desires to have the user's past usage history used to compute timeout intervals for webpages. A determination is made as to whether the user desires to use past usage history (decision 750). If the user has requested to use past usage history, then decision 750 branches to "yes" branch 752 whereupon, at step 755, the user's past history is retrieved from user time history data store 415. A determination is made as to whether past usage history was found for the requested webpage (decision 760). If past usage history was found for the requested webpage, then decision 760 branches to "yes" branch 762 whereupon, at step 765, the timeout interval is based, entirely or in part, on the user's past history of using the requested webpage as recorded in time history data store 415. On the other hand, if the usage history was not found for the webpage, then decision 760 branches to "no" branch 768 bypassing step 765. Returning to decision 750, if the user does not wish to use past usage history, then decision 750 branches to "no" branch 770 bypassing usage history steps 755 to 765. At step 775, the webpage is requested from the web server along with the timeout interval that was either retrieved from time preferences 310 or computed from time history data store 415. If no timeout interval was identified or computed, then at step 775 the webpage is requested without requesting a particular timeout interval (in which case the web server identifies an appropriate timeout interval using the steps shown in FIG. 6).

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A processor-implemented method comprising:
    establishing, over a network adapter, a plurality of network sessions with a plurality of client computer systems that include a first client computer system and a second client computer system;
    receiving, at the network adapter, a plurality of requests for a webpage, the plurality of requests originating from the plurality of client computer systems that include a first request originating from the first client computer system and a second request originating from the second client computer system;
    retrieving the requested webpage from a storage area accessible to a processor;
    initializing a plurality of non-equal timeout intervals in a memory area, wherein each of the plurality timeout intervals corresponds to one of the plurality of client computer systems, the initializing further comprising:
        calculating a first non-equal timeout interval based upon a first usage history corresponding to a first user utilizing the first client computer system, the first non-equal time interval included in plurality of non-equal time intervals; and
        calculating a second non-equal timeout interval based upon a second usage history corresponding to a second user utilizing the second client computer system, the second non-equal time interval included in plurality of non-equal time intervals and different than the first non-equal time interval:
    returning, over the network adapter, the requested webpage to the plurality of client computer systems; and
    terminating a selected one or more of the network sessions with a selected one or more of the client computer systems when the timeout intervals corresponding to the selected client computer systems has elapsed.

2. The method of claim 1 wherein the initializing of a selected one of the timeout intervals further comprises:
    identifying at least one of the plurality of requests that includes a requested timeout value, the identified request corresponding to a selected one of the plurality of client computer systems;
    determining that the requested timeout value is less than a maximum allowed timeout interval; and
    using the requested timeout value as the non-equal timeout interval corresponding to the selected one of the client computer systems in response to the determination.

3. The method of claim 2 wherein the requested timeout value is based upon one or more time preferences set by a user of the selected client computer system.

4. The method of claim 1 wherein the initializing of at least one of the timeout intervals further comprises:
    retrieving one or more webpage attributes corresponding to the requested web page;
    identifying a complexity of the webpage based upon the retrieved webpage attributes; and
    calculating the at least one of the time intervals based upon the identified complexity of the webpage.

5. The method of claim 1 further comprises:
    receiving an additional time request from a selected one of the client computer systems after the returning of the webpage to the selected client computer system; and
    adding additional time to the timeout interval that corresponds to the selected client computer system in response to receiving the additional time request.

6. The method of claim 1 further comprising:
    identifying that a selected one of the client computer systems is within a predetermined threshold of elapsing the timeout interval initialized for the selected client computer system;
    receiving a signal from the selected client computer system that indicates that a user of the selected client computer system is actively using the webpage; and
    adding additional time to the timeout interval that corresponds to the selected client computer system in response to receiving the signal.

7. An information handling system comprising:
    one or more processors;
    a memory coupled to at least one of the processors;
    a nonvolatile storage area coupled to at least one of the processors;
    a network adapter that connects the information handling system to a computer network; and
    a set of instructions stored in the memory and executed by at least one of the processors in order to perform actions of:
        establishing, over the network adapter, a plurality of network sessions with a plurality of client computer systems that include a first client computer system and a second client computer system;
        receiving, at the network adapter, a plurality requests for a webpage, the plurality of requests originating from the plurality of client computer systems that include a first request originating from the first client computer system and a second request originating from the second client computer system;

retrieving the requested webpage from the memory;

initializing a plurality of non-equal timeout intervals in a memory area of the memory, wherein each of the plurality timeout intervals corresponds to one of the plurality of client computer systems, the initializing further comprising:

calculating a first non-equal timeout interval based upon a first usage history corresponding to a first user utilizing the first client computer system, the first non-equal time interval included in plurality of non-equal time intervals; and     calculating a second non-equal timeout interval based upon a second usage history corresponding to a second user utilizing the second client computer system, the second non-equal time interval included in plurality of non-equal time intervals and different than the first non-equal time interval;

returning, over the network adapter, the requested webpage to the plurality of client computer systems; and terminating a selected one or more of the network sessions with a selected one or more of the client computer systems when the timeout intervals corresponding to the selected client computer systems has elapsed.

8. The information handling system of claim 7 wherein the initializing of a selected one of the timeout intervals further comprises additional actions of:

identifying at least one of the plurality of requests that includes a requested timeout value, the identified request corresponding to a selected one of the plurality of client computer systems;

determining that the requested timeout value is less than a maximum allowed timeout interval; and     using the requested timeout value as the non-equal timeout interval corresponding to the selected one of the client computer systems in response to the determination.

9. The information handling system of claim 8 wherein the requested timeout value is based upon one or more time preferences set by a user of the selected client computer system.

10. The information handling system of claim 7 wherein the initializing of at least one of the timeout intervals further comprises additional actions of:

retrieving one or more webpage attributes corresponding to the requested web page;

identifying a complexity of the webpage based upon the retrieved webpage attributes; and     calculating the at least one of the time intervals based upon the identified complexity of the webpage.

11. The information handling system of claim 7 further comprising additional actions of:

receiving an additional time request from a selected one of the client computer systems after the returning of the webpage to the selected client computer system; and     adding additional time to the timeout interval that corresponds to the selected client computer system in response to receiving the additional time request.

12. The information handling system of claim 7 further comprising additional actions of:

identifying that a selected one of the client computer systems is within a predetermined threshold of elapsing the timeout interval initialized for the selected client computer system;

receiving a signal from the selected client computer system that indicates that a user of the selected client computer system is actively using the webpage; and     adding additional time to the timeout interval that corresponds to the selected client computer system in response to receiving the signal.

13. A computer program product stored in a non-transitory computer operable storage medium, comprising functional descriptive material that, when executed by an information handling system, causes the information handling system to perform actions that include:

establishing, over a network adapter, a plurality of network sessions with a plurality of client computer systems that include a first client computer system and a second client computer system;

receiving, at the network adapter, a plurality of requests for a webpage, the plurality of requests originating from the plurality of client computer systems that include a first request originating from the first client computer system and a second request originating from the second client computer system;

retrieving the requested webpage from a storage area accessible to a processor;

initializing a plurality of non-equal timeout intervals in a memory area, wherein each of the plurality timeout intervals corresponds to one of the plurality of client computer systems, the initializing further comprising:

calculating a first non-equal timeout interval based upon a first usage history corresponding to a first user utilizing the first client computer system, the first non-equal time interval included in plurality of non-equal time intervals; and         calculating a second non-equal timeout interval based upon a second usage history corresponding to a second user utilizing the second client computer system, the second non-equal time interval included in plurality of non-equal time intervals and different than the first non-equal time interval;

returning, over the network adapter, the requested webpage to the plurality of client computer systems; and     terminating a selected one or more of the network sessions with a selected one or more of the client computer systems when the timeout intervals corresponding to the selected client computer systems has elapsed.

14. The computer program product of claim 13 wherein the initializing of a selected one of the timeout intervals further comprises additional actions of:

identifying at least one of the plurality of requests that includes a requested timeout value, the identified request corresponding to a selected one of the plurality of client computer systems;

determining that the requested timeout value is less than a maximum allowed timeout interval; and     using the requested timeout value as the non-equal timeout interval corresponding to the selected one of the client computer systems in response to the determination.

15. The computer program product of claim 13 wherein the initializing of at least one of the timeout intervals further comprises additional actions of:

retrieving one or more webpage attributes corresponding to the requested web page;

identifying a complexity of the webpage based upon the retrieved webpage attributes; and     calculating the at least one of the time intervals based upon the identified complexity of the webpage.

16. The computer program product of claim 13 further comprises additional actions of:

receiving an additional time request from a selected one of the client computer systems after the returning of the webpage to the selected client computer system; and adding additional time to the timeout interval that corresponds to the selected client computer system in response to receiving the additional time request.

17. The computer program product of claim 13 further comprising additional actions of:

identifying that a selected one of the client computer systems is within a predetermined threshold of elapsing the timeout interval initialized for the selected client computer system;

receiving a signal from the selected client computer system that indicates that a user of the selected client computer system is actively using the webpage; and adding additional time to the timeout interval that corresponds to the selected client computer system in response to receiving the signal.

\* \* \* \* \*